Nov. 15, 1960  A. O. BOUTELLE  2,960,361
SPRING FASTENER AND SUPPLEMENTAL SUPPORT
Filed March 11, 1957
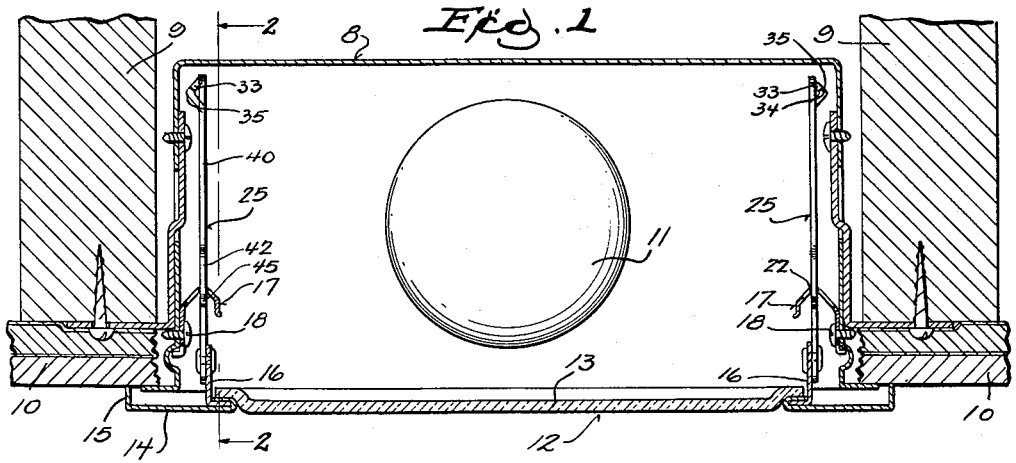
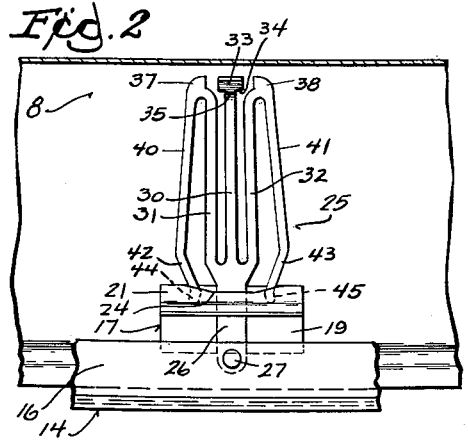
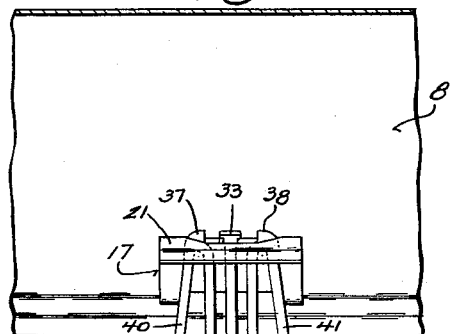
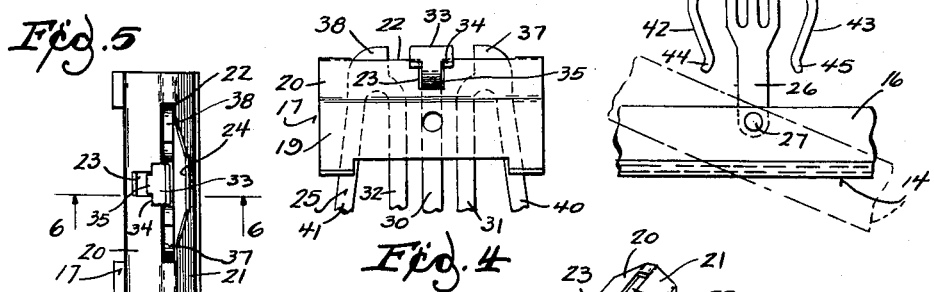
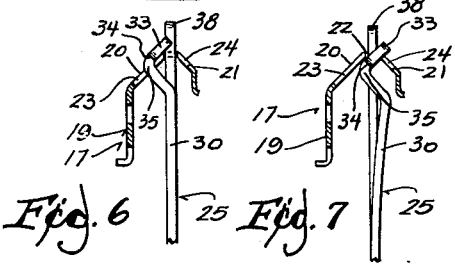
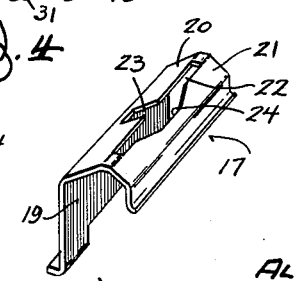
INVENTOR.
ALLEN O. BOUTELLE
BY
Wheeler, Wheeler & Wheeler
ATTORNEYS

United States Patent Office 2,960,361
Patented Nov. 15, 1960

2,960,361

SPRING FASTENER AND SUPPLEMENTAL SUPPORT

Allen O. Boutelle, Jefferson, Wis., assignor to Thomas Industries Inc., Fort Atkinson, Wis., a corporation of Delaware Filed Mar. 11, 1957, Ser. No. 645,167

16 Claims. (Cl. 292—17)

This invention relates to a spring fastener and supplemental support.

The invention has particular application to a lamp fixture and lens bezel or other closure which is releasably connected normally to the fixture and has a second position, short of complete removal, in which it is spaced from the fixture to give access thereto, as for the replacement of a lamp.

The device comprises a stamped sheet metal spring having arms which yield in the plane of the sheet metal and which are marginally provided with cam surfaces such that in their normal positions these arms resist displacement of the closure from the fixture. However, the connection is impositive and can be released under pressure sufficient to spring the arms. Under pressure adequate for this purpose, the arms pass through the slot of a complementary fitting until, just before the arms are wholly disengaged from the slot, a third arm intermediate the first two has its terminal head engaged by the fitting to arrest further movement of the parts. The terminal head on this third arm is shouldered to engage a portion of the fitting through which the third arm otherwise passes freely. The third arm has to be sprung in a direction at right angles to that in which the first two arms are yieldable in order to pass its head through the slot of the fitting. This releasing operation is not possible unless the weight of the closure is slightly relieved, the arrangement being such that the greater the downward gravity bias of the closure, the more secure will be the interlock between the third arm and the fitting.

In practice, the stamped spring device is desirably attached to the closure and the fitting is attached to the fixture. However, the parts may be reversed for other purposes if desired.

In the drawings:

Fig. 1 is a view in cross section of ceiling structure incorporating a flush type fixture having a closure supported in accordance with this invention.

Fig. 2 is a detail view taken in section on the line 2—2 of Fig. 1.

Fig. 3 is an enlarged detail view similar to Fig. 2 but showing the closure in its second or partially open position.

Fig. 4 is an enlarged fragmentary detail view in rear elevation of the anchorage fitting and the upper end of the latch parts.

Fig. 5 is a plan view of the spring latch and fiting in the relative positions of the parts shown in Fig. 3.

Fig. 6 is a view taken in section on the line 6—6 of Fig. 5.

Fig. 7 is a view similar to Fig. 6 showing the parts manipulated toward position for full separation.

Fig. 8 is a detail view of the latch anchorage fitting in perspective.

For convenience of exemplification, the invention is shown supplied to a fixture housing 8 recessed between joists 9 of ceiling 10. The housing contains a lamp bulb 11 which may from time to time require replacement. For this purpose the closure 12 can be opened or completely removed through means of the spring latch and complementary fitting hereinafter to be described. The closure 12 may include a glass 13 and trim or bezel ring 14 which has a flange 15 engaging the lower finished surface of the ceiling as shown. Another flange 16 of the bezel ring is upstanding and to it, at opposite sides of the housing, are connected a pair of the spring latches embodying the invention.

Also contemplated by the invention are the fittings 17 which cooperate with the spring latches and are connected with the fixture housing, as by means of the sheet metal screws 18 shown in Fig. 1. The fitting 17 is separately illustrated in Fig. 8. It is made of sheet metal to comprise an upright support panel 19 and a pair of angularly related panels 20 and 21, at the apex of which a slot 22 is provided. One margin of the slot is notched at 23 into panel 20. The other margin of the slot is broadly relieved at 24 into panel 21. The purposes of these enlargements of the slot wil hereinafter be described.

The spring latch member comprises a single piece of sheet metal generically designated by reference character 25. It comprises a shank portion 26 connected by a rivet 27 with the flange 16 of the closure 12. Since the rivets 27 of the opposite spring latches 25 are substantially aligned in practice, pivotal movement between the closure and the fixture is readily possible when the closure is dropped to the access position in which it is illustrated in Fig. 3.

Extending from the upper end of shank 26 are three arms 30, 31 and 32. The central arm 30 terminates in a head portion 33 shouldered at 34. Desirably the head portion is bent slightly out of the plane of the rest of the stamping by bending the portion 35 of the arm in one direction and then reversely bending the head portion in the opposite direction as clearly appears in Figs. 5, 6 and 7.

The arms 31 and 32, lying at opposite sides of the arm 30, extend to upper terminal portions at 37, 38 which are desirably at about the level of head 33 and have their external margins curvilinearly cammed to facilitate introduction into the anchorage fitting 17. Thence the extensions 40, 41 extend downwardly toward the shank and have their outer margins provided with laterally projecting cam surfaces 42, 43 as best shown in Figs. 2 and 3. The lower ends 44, 45 of these arm extensions 40, 41 are entirely free of the shank and connected therewith solely through the whole length of arms 31, 32. The dimensions are such that the free end portions 44, 45 will normally be engaged under substantial resilient bias within the ends of slot 22 as best shown in Figs. 2 and 5, the over-all transverse width between cam margins 42 and 43 considerably exceeding the length of the slot.

With the end portions 44 and 45 engaged with the fitting 17 at the ends of slot 22, as shown in Fig. 2, the deformation of arm extensions 40 and 41 and arms 31 and 32 will be relatively slight. The weight of the closure is not great. The convergent end portions 44 and 45 transmit the weight directly to the fitting.

However, a downward pull on the closure 12 will cam the arm extensions 40 and 41 inwardly until their elbows 42 and 43 clear the fitting. After these elbows pass through the slot 22, the extensions will be permitted to expand and finally the closure will come to rest as a result of the engagement of head 33 with the beveled panel 20 at opposite sides of the notch 23 through which the center arm 30 of the spring extends. The offset of head 33 is such that it cannot pass through any portion of slot 22 unless deflected from its normal position by the bending of arm 30. Figs. 2 to 6 show how the head and the slot fitting are interlocked, any downward bias on the spring 25 merely engaging the parts more tightly. In the position of the parts illustrated in Figs. 3 to 6, the closure 12 may be oscillated upon the rivets 27 which connect the spring latches thereto. This allows free access to the interior of housing 8 for the removal or replacement of the lamp bulb 11.

However, for changes in the wiring, or for other purposes, it may be desired to remove the closure completely. For this purpose, each spring latch has to be lifted slightly to disengage the head 33 from the beveled panel 20. Thereupon the spring arm 30 may be bent to the right as viewed in Fig. 7 to register the head 33 with the relieved or widened portion 24 of the slot 22, this widened portion having sufficient area to pass the head 33 freely. The apices 37, 38 at the juncture of arms 31 and 32 with extensions 42 and 43 now pass downwardly from slot 22 and the respective spring fasteners are completely disengaged from the respective fittings, thereby releasing the closure and leaving the housing 8 entirely open.

Due to the upward convergence of panels 20 and 21 of the respective fittings, the upper end portions 33, 37 and 38 of the spring fastener are guided toward the slot 22, through which they pass freely in the direction of assembly. As soon as the head 33 clears panel 20 in the direction of assembly, the fastener is already locked in its intermediate position respecting the fitting. Continued upward movement of the respective fastener will ultimately cam the arm extensions 40 and 41 inwardly until their elbowed portions 42 and 43 clear the ends of the slot, whereupon the bias of the extensions will cause them to expand toward the position of Fig. 2, in which position the closure is held tightly but impositively to the housing, being freely releasable in response to downward bias as above described.

I claim:

1. A fastener adapted to cooperate with a fitting having a slot, said fastener comprising arms extending through the slot and having cam elbows intermediate the ends of the arms and toward which arm portions at opposite sides of the elbows converge, said elbows being normally spaced apart a distance greater than the length of the slot for engagement of said arm portions with said fitting at the ends of the slot, said arms and elbows being resiliently yieldable in the plane of the slot to accommodate movement of the arms transversely of the plane of the slot.

2. The device of claim 1 in which the fastener comprises a flat sheet metal plate from which said arms are formed, said arms being yieldable in the plane of said plate.

3. The combination with a fitting having a slot, of a fastener comprising arms having cam elbows normally spaced to engage said fitting at the ends of the slot, the arms extending through the slot and the elbows being resiliently yieldable to accommodate movement of the arms respecting the fitting, said fastener having a third arm independent of the arms first mentioned and provided with an enlarged head engageable with the fitting to limit movement of the first mentioned arms through the slot of the fitting in a disengaging direction, the said third arm being resiliently flexible in a direction transverse respecting the plane of the arms and the slot having an enlargement adapted to accommodate and pass said head when the third arm is so flexed.

4. As a new article of manufacture, a spring fastener sub-combination comprising a flat sheet metal plate from which are formed a shank, a pair of arms projecting from the shank, extensions connected with said arms and resiliently yieldable in the plane of the plate with respect to said arms, the extensions extending back along said arms toward the shank and being provided with free end portions and with marginal cam elbows adjacent said end portions.

5. As a new article of manufacture, a spring fastener comprising a shank, a pair of arms projecting from the shank, extensions connected with said arms and resiliently yieldable with respect thereto, the extensions extending back along said arms toward the shank and being provided with free end portions and with marginal cam elbows adjacent said end portions, said shank being provided with a third arm intermediate the arms first mentioned and provided with a head and shoulders near the connection of said extensions with the first mentioned arms.

6. As a new article of manufacture, a fitting adapted to receive a spring fastener, said fitting comprising a mounting plate, a first panel bent in one direction from said mounting plate and extending obliquely respecting the mounting plate and a second panel bent in the same direction from the first panel and extending obliquely respecting the first panel, the said fitting being provided with a spring fastener receiving slot at the bend between said first and second panels and toward which the panels are convergent.

7. A fastener adapted to cooperate with a fitting comprising a mounting plate having a first panel extending obliquely therefrom, a second panel reversely oblique respecting the first panel and a slot toward which said panels are convergent, said fastener comprising a single sheet of resilient material constituting a shank normally disposed in the slot, a pair of arms extending from the shank and respectively provided with arm extensions extending reversely from the ends of said arms and having free end portions normally engaged in the slot and marginally provided with cam elbows resting on the fitting at the ends of the slot, the said extensions being resiliently yieldable in their own plane when subjected to pressure in a direction tending to withdraw the shank from the slot or reposition the shank in the slot.

8. The combination with a fitting comprising a mounting plate having a first panel extending obliquely therefrom, a second panel reversely oblique respecting the first panel and a slot toward which said panels are convergent, of a spring fastener comprising a single sheet of resilient material constituting a shank normally disposed in the slot, a pair of arms extending from the shank and respectively provided with arm extensions extending reversely from the ends of said arms and having free end portions normally engaged in the slot and marginally provided with cam elbows resting on the fitting at the ends of the slot, the said extensions being resiliently yieldable in their own plane when subjected to pressure in a direction tending to withdraw the shank from the slot or reposition the shank in the slot, in further combination with means independent of said arms for limiting normal movement of said fastener respecting the fitting to a range less than the total length of said extensions, whereby the extensions are normally mounted in the slot.

9. The device of claim 8 in which said limiting means comprises a third arm projecting from the shank intermediate the arms first mentioned and provided with a shouldered head, said third arm having an offset portion adjacent said head and said fitting having a notch in one of its panels opening into the slot and in which said offset portion is engaged, the said head being wider than the notch and normally being supported on the notched panel of said fitting at one extreme of said range of movement.

10. The device of claim 9 in which the fitting has an enlargement of the slot into the other panel of said fitting opposite said notch, the enlargement being of sufficient dimensions to allow said head to pass therethrough when said third arm is deflected in a direction normal to its plane.

11. In a housing having a closure movable to and from the housing and wholly detachable therefrom, means for guiding the said movement and permitting such detachment, said means comprising a fitting adapted to be connected with the housing and having an inwardly projecting portion provided with a slot, and a plate adapted to be connected with the closure and reciprocable through the slot, said plate including arms having yieldable portions provided with elbow cams normally engaged with the fitting at the ends of the slot, said arm portions guiding said plate for movement with respect to the fitting and said elbow cams normally supporting the closure in operative relation to the housing and being yieldable to permit said arms to pass through the slot to and from normal position of the closure respecting the housing.

12. The device of claim 11 in which the plate is provided with means other than said arms for limiting the movement of the plate with respect to the fitting to insure that said arms remain in the slot.

13. The device of claim 12 in which the said means is disengageable to permit complete withdrawal of the plate from said fitting.

14. The combination with a housing and a closure movable to and from the housing and wholly detachable therefrom, of means for guiding the said movement and permitting such detachment, said means comprising a fitting connected with the housing and having an inwardly projecting portion provided with a slot, and a plate connected with the closure and reciprocable through the slot, said plate including arms having yieldable portions provided with elbow cams normally engaged with the fitting at the ends of the slot, said arm portions guiding said plate for movement with respect to the fitting and said elbow cams normally supporting the closure in operative relation to the housing and being yieldable to permit said arms to pass through the slot to and from normal position of the closure respecting the housing, said housing having a single pair of said fittings at opposite sides of the housing and centrally disposed with respect thereto, the closure having fasteners normally disposed in the slots of each of said fittings and the said fasteners being pivotally connected with the closure intermediate the sides thereof and at opposite aligned points whereby the closure is oscillatable respecting said fasteners.

15. The combination with a downwardly opening housing containing structure to which access is desired and a closure therefor, of oppositely disposed fittings connected with the housing and having inwardly projecting portions slotted transversely of the housing, the closure having correspondingly located fastener plates pivotally connected to the closure to facilitate tilting the closure for access to said structure within the housing, each such plate including a shank portion having upwardly projecting laterally spaced arms normally disposed in the slots of the respective fittings, the said arms having downwardly extending extensions marginally provided near their lower free ends with cam elbows spaced at a distance in excess of the length of the respective slots, the said elbows resting on top of their respective fittings to support the closure in closed relation to the housing and being yieldable by flexation of said arm extensions in their own planes to accommodate movement of the closure to and from closed relation to the housing, the said extensions guiding the plates in the course of said movement.

16. The device of claim 15 in further combination with a third arm connected to each plate intermediate the arms first mentioned and normally disposed in the slot of its respective fitting, the third arm having a head and neck portion offset from the plane of the third arm, the respective fittings having notches opening into their respective slots and in which the neck portions are normally disposed, the head portions being engaged with the fitting at opposite sides of the respective notch to limit downward movement of the closure respecting the housing.

References Cited in the file of this patent

UNITED STATES PATENTS

| | | |
|---|---|---|
| 377,275 | Ringen | Jan. 31, 1888 |
| 1,573,368 | Barnes | Feb. 16, 1926 |
| 1,771,184 | McLaughlin | July 22, 1930 |
| 2,006,747 | Ritz-Woller | July 2, 1935 |
| 2,151,284 | Tinnerman | Mar. 21, 1939 |
| 2,168,665 | Branam | Aug. 8, 1939 |
| 2,668,074 | Falk | Feb. 2, 1954 |
| 2,792,245 | Dasher et al. | May 14, 1957 |
| 2,794,664 | Kruger | June 4, 1957 |
| 2,869,908 | Ford | Jan. 20, 1959 |